United States Patent
Longman et al.

(10) Patent No.: US 10,838,038 B2
(45) Date of Patent: Nov. 17, 2020

(54) MULTI-MODE RADAR ANTENNA

(71) Applicant: GM GLOBAL TECHNOLOGY OPERATIONS LLC, Detroit, MI (US)

(72) Inventors: Oren Longman, Tel Aviv (IL); Shahar Villeval, Tel Aviv (IL); Igal Bilik, Rehovot (IL); Evgeny Tsalolikhin, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 16/013,079

(22) Filed: Jun. 20, 2018

(65) Prior Publication Data

US 2019/0391229 A1    Dec. 26, 2019

(51) Int. Cl.
| | | |
|---|---|---|
| *G01S 7/03* | (2006.01) | |
| *H01Q 1/32* | (2006.01) | |
| *G01S 13/931* | (2020.01) | |
| *H01Q 3/34* | (2006.01) | |
| *G01S 13/89* | (2006.01) | |
| *H01Q 21/22* | (2006.01) | |

(52) U.S. Cl.
CPC .............. *G01S 7/032* (2013.01); *G01S 13/89* (2013.01); *G01S 13/931* (2013.01); *H01Q 1/3233* (2013.01); *H01Q 3/34* (2013.01); *H01Q 21/22* (2013.01)

(58) Field of Classification Search
CPC ........ G01S 7/032; G01S 13/89; G01S 13/931; H01Q 3/34; H01Q 21/22; H01Q 1/3233
USPC ........................................................ 342/371
See application file for complete search history.

(56) References Cited

U.S. PATENT DOCUMENTS

| | | | | |
|---|---|---|---|---|
| 4,348,679 A | * | 9/1982 | Shnitkin ................ | H01Q 25/00 342/368 |
| 5,204,686 A | * | 4/1993 | Petrelis .................... | H01Q 3/22 342/372 |
| 5,214,436 A | * | 5/1993 | Hannan .................. | H01Q 1/283 343/705 |
| 6,114,998 A | * | 9/2000 | Schefte .................. | H01Q 1/243 343/700 MS |
| 6,593,876 B2 | * | 7/2003 | Shuch ...................... | H01Q 3/26 342/351 |
| 7,183,995 B2 | * | 2/2007 | Pleva ...................... | G01S 7/032 342/374 |
| 8,593,333 B2 | * | 11/2013 | Wintermantel ......... | G01S 7/032 342/70 |
| 9,575,160 B1 | * | 2/2017 | Davis ........................ | G01S 7/35 |

(Continued)

FOREIGN PATENT DOCUMENTS

| | | |
|---|---|---|
| CN | 102066970 A | 5/2011 |
| CN | 107076832 A | 8/2017 |
| CN | 107403991 A | 11/2017 |

*Primary Examiner* — Peter M Bythrow
*Assistant Examiner* — Alexander L. Syrkin
(74) *Attorney, Agent, or Firm* — Lorenz & Kopf, LLP

(57) ABSTRACT

A multi-mode radar antenna apparatus is provided. The apparatus includes a transmitting antenna section comprising a first plurality of transmitting antennas configured to a transmit a steerable mode signal, a second plurality of transmitting antennas configured to a transmit an imaging mode signal, and a third plurality of transmitting antennas configured to a transmit an imaging mode signal and a steerable mode signal, and a receiving antenna section comprising a plurality of receiving antennas.

20 Claims, 3 Drawing Sheets

(56) References Cited

U.S. PATENT DOCUMENTS

| | | | |
|---|---|---|---|
| 9,880,275 B2* | 1/2018 | Jeong | G01S 13/003 |
| 10,403,983 B2* | 9/2019 | Lim | H01Q 3/2605 |
| 2010/0328157 A1* | 12/2010 | Culkin | H01Q 21/061 |
| | | | 342/372 |
| 2011/0074621 A1* | 3/2011 | Wintermantel | H01Q 1/3233 |
| | | | 342/70 |
| 2013/0027240 A1* | 1/2013 | Chowdhury | G01S 13/584 |
| | | | 342/94 |
| 2015/0002329 A1* | 1/2015 | Murad | G01S 13/931 |
| | | | 342/155 |
| 2016/0131738 A1 | 5/2016 | Prechtel et al. | |
| 2017/0365933 A1* | 12/2017 | Topak | H01Q 1/3233 |

\* cited by examiner

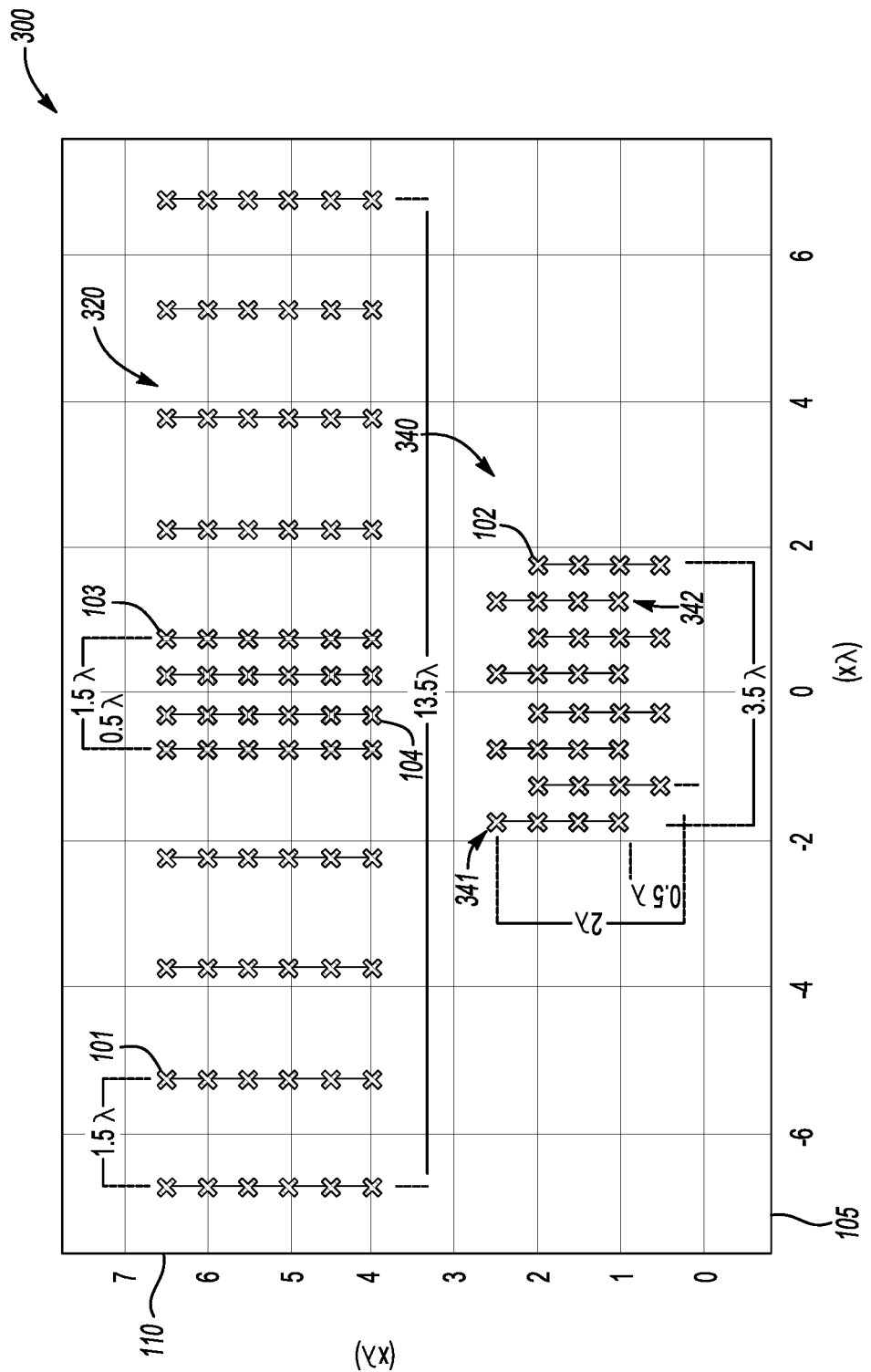

MULTI-MODE RADAR ANTENNA

INTRODUCTION

Field of the Invention

Apparatuses consistent with exemplary embodiments relate to radar antenna designs. More particularly, apparatuses consistent with exemplary embodiments relate to multi-mode radar antenna designs.

Background

Vehicles such as a passenger car, trucks, sports utility vehicles (SUVs), recreational vehicles (RVs), marine vessels, aircraft, etc., are being equipped with imaging, radar and/or vision systems. For example, vehicles may have cameras, lidars, radars or other imaging sensors facing one or more areas around a vehicle such as a front facing camera, a rear facing camera, a side facing camera. In one example, radars may be used to perceive or capture images of an environment around a vehicle. The radars may also be used to determine the presence of objects and/or other indicators or interest.

SUMMARY

One or more exemplary embodiments provide a multi-mode radar antenna. More particularly, one or more exemplary embodiments provide a multi-mode radar antenna capable of operating in steerable and imaging modes.

According to an aspect of an exemplary embodiment, a multi-mode radar antenna is provided. The antenna includes a transmitting antenna section comprising a first plurality of transmitting antennas configured to a transmit a steerable mode signal, a second plurality of transmitting antennas configured to a transmit an imaging mode signal, and a third plurality of transmitting antennas configured to a transmit an imaging mode signal and a steerable mode signal; and a receiving antenna section comprising a plurality of receiving antennas.

The second plurality of transmitting antennas may be disposed between the first plurality of transmitting antennas.

The second plurality of transmitting antennas may be disposed between the third plurality of transmitting antennas.

The first plurality of transmitting antennas may be a first set of steerable mode signal transmission antennas with a spacing of $1.5\lambda$ between antennas of the first set of steerable mode signal transmission antennas and a second set of steerable mode signal transmission antennas with a spacing of $1.5\lambda$ between antennas of the second set of steerable mode signal transmission antennas, and the first set and the second set may be disposed horizontally along an axis, where $\lambda$ is a wavelength of a signal being transmitted or received by an antenna.

The third plurality of transmitting antennas comprise a set of antennas configured to transmit the imaging mode signal and the steerable mode signal and disposed horizontally along the axis with a spacing of $1.5\lambda$.

The second plurality of transmitting antennas may include a set of antennas configured to transmit the imaging mode signal and disposed horizontally along the axis with a spacing of $0.5\lambda$.

A distance between a first antenna of the first set of steerable mode transmission antennas and a last antenna of the second set of steerable mode transmission antennas along the horizontal axis is $13.5\lambda$.

The plurality of receiving antennas of the receiving antenna section may be a distance of $0.5\lambda$ apart from each other along the horizontal axis.

The plurality of receiving antennas of the receiving antenna section may include a first row of receiving antennas and second rows of receiving antennas disposed below the first row of receiving antennas.

The first row and the second rows may be a distance of $1\lambda$ apart along a vertical axis.

The second rows may be a distance of $0.5\lambda$ apart along the vertical axis.

The second rows have a width of $2.5\lambda$ along the horizontal axis.

The vertical distance from the first row to a last row of the second rows may be a distance of $1.5\lambda$ along the vertical axis.

The apparatus may include a plurality of the transmitting antenna sections are disposed along a vertical axis.

The plurality of the transmitting antenna sections may be spaced at a distance of $0.5\lambda$ along the vertical axis.

The plurality of receiving antennas of the receiving antenna section may include first columns of receiving antennas and second columns of receiving antennas, and a top of the second columns of receiving antennas may be $0.5\lambda$ lower than a top of the first columns of receiving antennas along a vertical axis.

A distance between a top of the first columns of receiving antennas and a bottom of the second columns of receiving antennas along the vertical axis may be $2\lambda$.

A distance between a first column of the first columns of receiving antennas and a last column of the second columns of receiving antennas along the horizontal axis may be $3.5\lambda$.

The apparatus may further include a plurality of the transmitting antenna sections disposed along a vertical axis.

The plurality of the transmitting antenna sections may be spaced at a distance of $0.5\lambda$ along the vertical axis.

Other objects, advantages and novel features of the exemplary embodiments will become more apparent from the following detailed description of exemplary embodiments and the accompanying drawings.

BRIEF DESCRIPTION OF THE DRAWINGS

FIG. 3 shows a diagram of a multi-mode radar antenna apparatus according to another exemplary embodiment.

DETAILED DESCRIPTION

Figure 1:
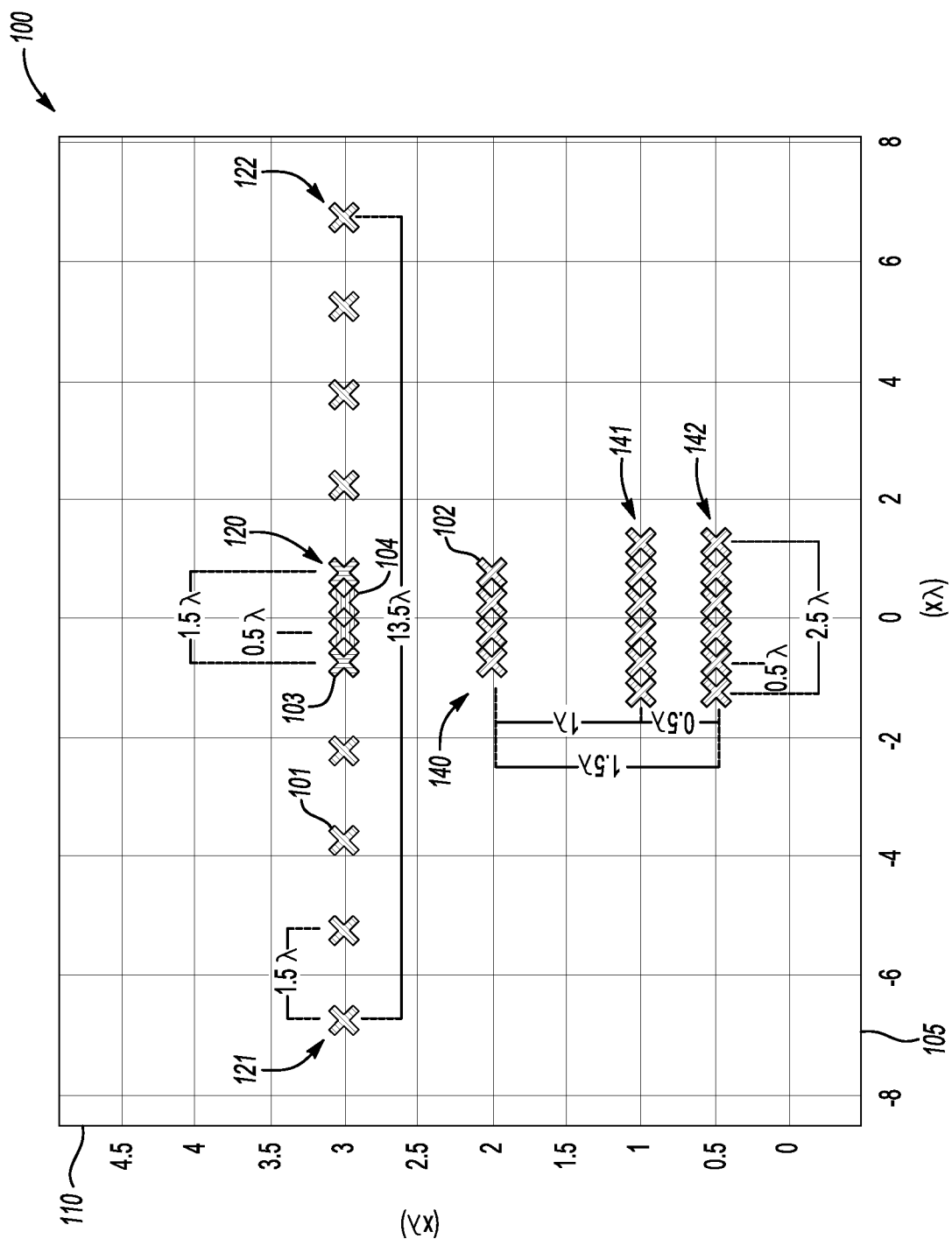
FIG. 1 shows a diagram of a multi-mode radar antenna apparatus according to an exemplary embodiment.

Several exemplary embodiments of a multi-mode radar antenna apparatus will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

One type of radar that may be used in an automotive or other vehicle application is a multi-mode radar. The multi-mode radar may include antenna elements for both multiple-input multiple-output (MIMO) and phased array radar operation. An antenna layout for such a radar preferably achieves a high angular resolution at a wide field of view both in azimuth and elevation. This will help enable operation at highway intersection scenarios that require detection and localization of fast-moving targets. The gain of the antenna should preferably be high to enable detection of small targets at long-ranges. Moreover, a layout that supports both steerable beam mode and imaging mode to reduce number of radars per vehicle platform and to enable flexibility of their operation.

In imaging mode, objects above the ground level are detected, localized and their shape is estimated. Examples of objects include vehicles, pedestrian, infrastructure, etc. An example operation range of the imaging mode may be around 90 meters with a wide field of view (FOV) (e.g., 90 degree) to provide 360 degree coverage with the minimal number of radars. A feature of imaging mode is high angular resolution at a wide FOV required for shape estimation of objects. In the steerable beam mode, a narrower FOV (~14 degree) and a longer range (greater than 200 m) is provided for at an intersection, interchange, or where faster traffic is expected, for example). The steerable beam can be directed or moved throughout the 90 degree FOV.

FIG. 1 shows a diagram of a multi-mode radar antenna apparatus 100 according to an exemplary embodiment. Referring to FIG. 1, a multi-mode radar antenna apparatus 100 includes a transmitting antenna section 120 and a receiving antenna section 140.

The transmitting antenna section 120 includes a first plurality of transmitting antennas 101 configured to transmit a steerable beam mode signal, a second plurality of transmitting antennas 104 configured to transmit an imaging beam mode signal, and a third plurality of transmitting antennas 103 configured to transmit an imaging mode signal and a steerable beam mode signal. The receiving antenna section 140 may include a plurality of receiving antennas 102.

The imaging beam mode signal may be a radio-frequency (RF) beam used to image an area. The imaging beam mode signal is transmitted and reflects off a target. The resulting reflection issued to create an image of an area.

The steerable beam mode signal may be an electronically-steerable RF beam created by phased-array antennas. In particular, a feed current for each antenna of the phased-array antennas passes through a phase shifter. The phase shifters delay the radio waves progressively so each antenna emits its wave at a different time. The resulting beam from the phased-array antennas can be directed at an angle to the phased-array antennas' axis. Adjusting the phase shifts can change the resulting beam's direction.

The third plurality of transmitting antennas 103 are disposed between the first plurality of transmitting antennas. The second plurality of transmitting antennas 104 are disposed between the third plurality of transmitting antennas 103.

The first plurality of transmitting antennas 101 includes a first set of steerable mode signal transmission antennas 121 with a spacing of $1.5\lambda$ (where $\lambda$ is the wavelength of the signal) between antennas of the first set of steerable mode signal transmission antennas 121 and a second set of steerable mode signal transmission antennas 122 with a spacing of $1.5\lambda$ between antennas of the second set of steerable mode signal transmission antennas. The first set 121 of antennas and the second set 122 are disposed horizontally along an axis.

The third plurality of transmitting antennas 103 include a set of antennas configured to transmit the imaging mode signal and the steerable mode signal and disposed horizontally along the axis with a spacing of $1.5\lambda$. The second plurality of transmitting antennas 104 include a set of antennas configured to transmit the imaging mode signal and may be disposed horizontally along the axis with a spacing of $0.5\lambda$. The distance between a first antenna of the first set of steerable mode signal transmission antennas 121 and a last antenna of the second set of steerable mode signal transmission antennas 122 along the horizontal axis may be $13.5\lambda$.

The plurality of receiving antennas 102 of the receiving antenna section 140 may be a distance of $0.5\lambda$ apart from each other along the horizontal axis. The plurality of receiving antennas 102 of the receiving antenna section 140 may include a first row 141 of receiving antennas 102 and second rows 142 of receiving antennas disposed below the first row 141 of receiving antennas. The first row 141 and the second rows 142 may be a distance of $1\lambda$ apart along a vertical axis. The second rows 142 may be a distance of $0.5\lambda$ apart from each other along the vertical axis. The second rows 142 may have a width of $2.5\lambda$ along the horizontal axis. The vertical distance from the first row 141 to a last row of the second rows 142 may be a distance of $1.5\lambda$ along the vertical axis.

Figure 2:
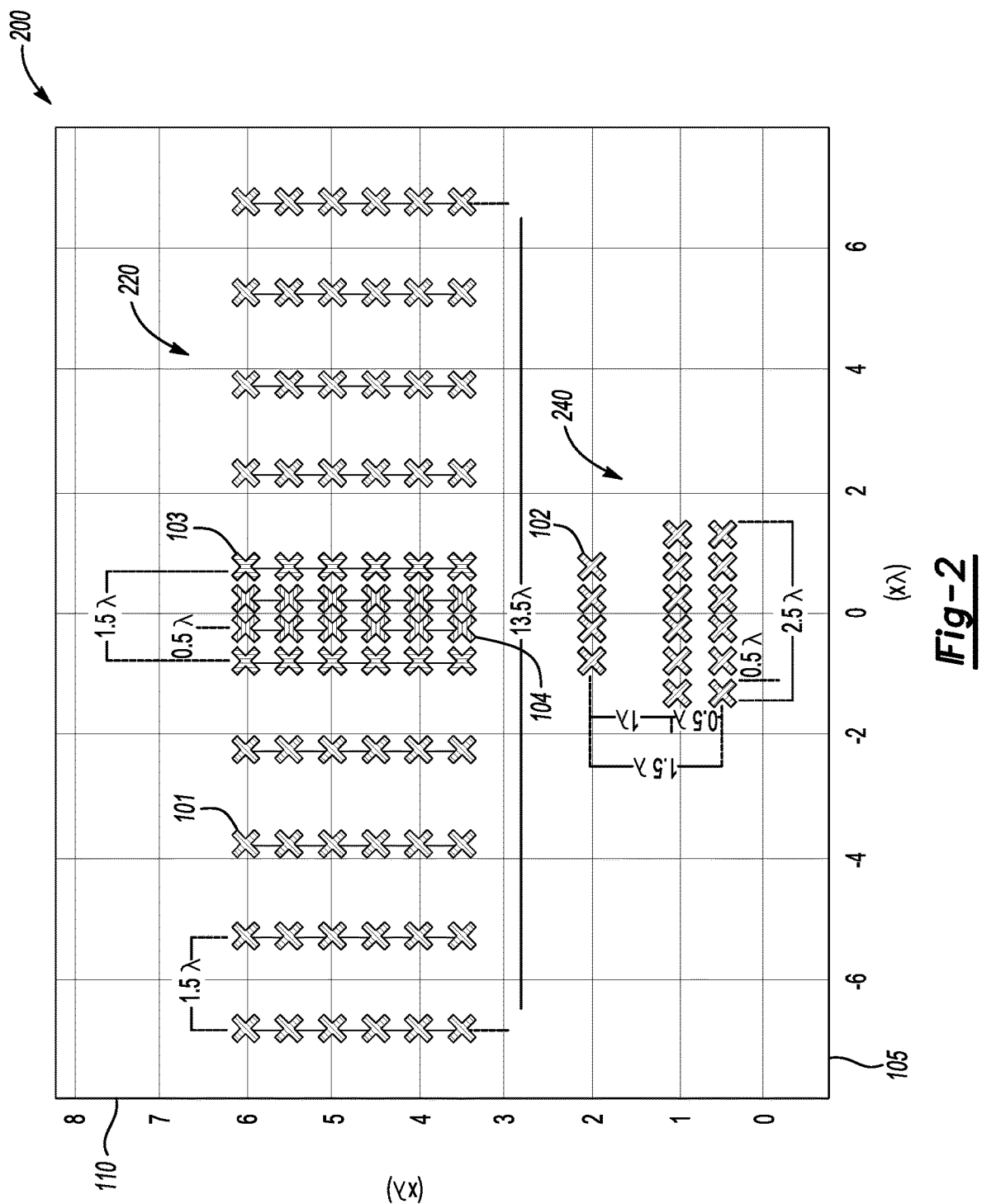
FIG. 2 shows a diagram of a multi-mode radar antenna apparatus according to another exemplary embodiment.

FIG. 2 shows a diagram of a multi-mode radar antenna apparatus 200 according to another exemplary embodiment. Referring to FIG. 2, the receiving antenna section 240 of FIG. 2 is similar to the receiving antenna section 140 of FIG. 1, thus the repeated description is omitted.

In FIG. 2, the transmitting antenna section 220 is similar to transmitting antenna section 120 of FIG. 1, except it includes a plurality of rows of transmitting antenna sections similar to those described with respect to FIG. 1. The plurality of the transmitting antenna sections are spaced at a distance of $0.5\lambda$ apart along the vertical axis.

In FIG. 2, the antenna layout was changed to increase detection range. In particular, the plurality of the transmitting antenna sections include patches (columns) of antennas represented by vertical lines running through the columns of antennas. Each patch strip of the transmitting antenna section is includes six (6) patch element(s). The element gain is increased by a factor of 6.

FIG. 3 shows a diagram of a multi-mode radar antenna apparatus 300 according to another exemplary embodiment.

Referring to FIG. 3, the transmitting antenna section 320 of FIG. 3 is similar to the transmitting antenna section 220 of FIG. 2, thus the repeated description is omitted.

In FIG. 3, the receiving antenna section 340 differs from receiving antenna sections 140 and 240. In particular, the receiving antenna section 340 includes a plurality of receiving antennas including first columns of receiving antennas 341 and second columns of receiving antennas 342. The first columns of receiving antennas 341 and second columns of receiving antennas 342 are patch strips as represented by the vertical lines of 4 patch elements. The top of the second columns of receiving antennas may be 0.5λ lower than a top of the first columns of receiving antennas when measured along a vertical axis.

In the receiving antenna section 340, a distance between a top of the first columns of receiving antennas and a bottom of the second columns of receiving antennas along the vertical axis may be 2λ. In addition, the distance between a first column of the first columns of receiving antennas and a last column of the second columns of receiving antennas along the horizontal axis may be 3.5λ.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A multi-mode radar antenna apparatus comprising:
a transmitting antenna section comprising a first plurality of transmitting antennas configured to a transmit a steerable mode signal, a second plurality of transmitting antennas configured to a transmit an imaging mode signal, and a third plurality of transmitting antennas configured to a transmit an imaging mode signal concurrent with the second plurality of transmitting antennas and a steerable mode signal concurrent with the first plurality of transmitting antennas wherein the third plurality of transmitting antennas includes at least one of the first plurality of transmitting antennas and at least one of the second plurality of transmitting antennas and wherein the third plurality of transmitting antennas is spaced 1.5λ from the first plurality of transmitting antennas and 0.5λ from the second plurality of transmitting antennas; and
a receiving antenna section comprising a plurality of receiving antennas.

2. The apparatus of claim 1, wherein the second plurality of transmitting antennas are disposed between the first plurality of transmitting antennas.

3. The apparatus of claim 2, wherein the second plurality of transmitting antennas are disposed between the third plurality of transmitting antennas.

4. The apparatus of claim 3, wherein the first plurality of transmitting antennas comprises a first set of steerable mode signal transmission antennas with a spacing of 1.5λ between antennas of the first set of steerable mode signal transmission antennas and a second set of steerable mode signal transmission antennas with a spacing of 1.5λ between antennas of the second set of steerable mode signal transmission antennas, and
wherein the first set and the second set are disposed horizontally along an axis, and where λ is a wavelength of a signal being transmitted or received by an antenna.

5. The apparatus of claim 4, wherein the third plurality of transmitting antennas comprise a set of antennas configured to transmit the imaging mode signal and the steerable mode signal and disposed horizontally along the axis with a spacing of 1.5λ.

6. The apparatus of claim 5, wherein the second plurality of transmitting antennas comprise a set of antennas configured to transmit the imaging mode signal and disposed horizontally along the axis with a spacing of 0.5λ.

7. The apparatus of claim 6, wherein a distance between a first antenna of the first set of steerable mode transmission antennas and a last antenna of the second set of steerable mode transmission antennas along the horizontal axis is 13.5λ.

8. The apparatus of claim 7, wherein the plurality of receiving antennas of the receiving antenna section are a distance of 0.5λ apart from each other along the horizontal axis.

9. The apparatus of claim 8, wherein the plurality of receiving antennas of the receiving antenna section comprise a first row of receiving antennas and second rows of receiving antennas disposed below the first row of receiving antennas.

10. The apparatus of claim 9, wherein the first row and the second rows are a distance of 1λ apart along a vertical axis.

11. The apparatus of claim 10, wherein the second rows are a distance of 0.5λ apart along the vertical axis.

12. The apparatus of claim 11, wherein the second rows have a width of 2.5λ along the horizontal axis.

13. The apparatus of claim 12, wherein the vertical distance from the first row to a last row of the second rows is a distance of 1.5λ along the vertical axis.

14. The apparatus of claim 13, further comprising a plurality of the transmitting antenna sections are disposed along a vertical axis.

15. The apparatus of claim 14, wherein the plurality of the transmitting antenna sections are spaced at a distance of 0.5λ along the vertical axis.

16. The apparatus of claim 8, wherein the plurality of receiving antennas of the receiving antenna section comprise first columns of receiving antennas and second columns of receiving antennas, and
wherein a top of the second columns of receiving antennas is 0.5λ lower than a top of the first columns of receiving antennas along a vertical axis.

17. The apparatus of claim 16, wherein a distance between a top of the first columns of receiving antennas and a bottom of the second columns of receiving antennas along the vertical axis is 2λ.

18. The apparatus of claim 17, wherein a distance between a first column of the first columns of receiving antennas and a last column of the second columns of receiving antennas along the horizontal axis is 3.5λ.

19. The apparatus of claim 18, further comprising a plurality of the transmitting antenna sections disposed along a vertical axis.

20. The apparatus of claim 19, wherein the plurality of the transmitting antenna sections are spaced at a distance of 0.5λ along the vertical axis.

* * * * *